United States Patent [19]

Ard

[11] Patent Number: 5,915,106

[45] Date of Patent: Jun. 22, 1999

[54] METHOD AND SYSTEM FOR OPERATING A SCANNER WHICH EMULATES A DISK DRIVE

[75] Inventor: Mark Ard, Santa Clara, Calif.

[73] Assignees: Ricoh Company, Ltd., Tokyo, Japan; Ricoh Corporation, San Jose, Calif.

[21] Appl. No.: 08/821,343

[22] Filed: Mar. 20, 1997

[51] Int. Cl.$^6$ .............................. G06F 13/10; G06F 13/12
[52] U.S. Cl. .......................... 395/500; 395/308; 395/309
[58] Field of Search .................................. 395/500, 308, 395/309

[56] References Cited

U.S. PATENT DOCUMENTS 5,508,821  4/1996  Murata ..................................... 358/442

*Primary Examiner*—Kevin J. Teska
*Assistant Examiner*—Hugh Jones
*Attorney, Agent, or Firm*—Oblon, Spivak, McClelland, Maier & Neustadt, P.C.

[57] ABSTRACT

A scanner is provided with a disk drive emulator and is attached to a general purpose computer via a SCSI bus. The disk drive emulator provides signals such that the general purpose computer identifies the scanner as a disk drive. Applications running on the general purpose computer direct operation of the scanner via standard operating system disk drive commands. To facilitate the transfer of commands to the scanner, a scanner parameters setup program, also known as an Application Program Interface (API), is provided that is resident on the scanner and accessible to the general purpose computer via the disk drive emulator. When executed, the scanner parameters setup program provides a graphically oriented menu allowing a user to enter parameters such as resolution, brightness, contrast, etc. Once entered, the parameters are saved to the scanner via a File Save command. An application running on the general purpose computer then operates the scanner in accordance with the parameters thus saved by performing a File Open command on a file visible to the general purpose computer via the disk drive emulator and corresponding to the saved parameters. Image data resulting from operation of the scanner is transferred from the scanner via the disk drive emulator to the general purpose computer as if a file is being opened. Alternatively, the scanner is operated upon the saving of the parameters to the scanner, and image data resulting therefrom is saved as a file to a storage device accessible to the general purpose computer.

22 Claims, 10 Drawing Sheets

METHOD AND SYSTEM FOR OPERATING A SCANNER WHICH EMULATES A DISK DRIVE

BACKGROUND OF THE INVENTION

FIELD OF THE INVENTION

This invention relates to an interface structure for peripheral devices such that those devices may be attached to any one of various computer systems without a specifically developed driver. The invention is more particularly related to an apparatus and interface structure which allows a computer to control a peripheral device connected to that computer by a Small Computer System Interface (SCSI) bus via standard operating system disk drive commands without utilizing a specifically developed device driver. The invention is still further related to a scanning apparatus that can be connected between one of multiple computer and operating systems and which can be controlled either independently or from within a graphics application running on a host computer without a device driver installed on the host computer for the scanning apparatus.

DISCUSSION OF THE BACKGROUND

With the increasing use of computer peripheral devices in both the home and office environments, computer users and system maintainers are increasingly confronted with the tasks of installing new and upgraded peripherals and related software packages. Typically, because peripherals are not standardized as to an interface protocol between the peripheral and a host computer, one of the related software packages that must be installed with a new peripheral device is a device driver.

The device driver places communications between an application and peripheral device in the proper format required by the peripheral device. Thus, an application wishing to access a peripheral device makes an access request to the appropriate device driver which then formats communications as required by the peripheral device allowing communication between the peripheral device and the application. Device drivers are often referred to as software or peripheral drivers and are commonly included when peripheral devices are purchased. Device drivers for peripheral devices are normally available free of charge from peripheral device manufacturers and can often be downloaded off the Internet.

While the installation of device drivers for a specific peripheral device is not a particularly difficult problem, it is complicated by a multitude of available peripheral devices, several available computer platforms and related operating systems, and multiple versions of each of the above.

Because of the plurality of peripherals, platforms, systems and versions thereof, problems are often encountered when installing a new peripheral device which revolve around installation of the appropriate driver specific to the device and system on which the peripheral is being installed. These problems are typically manifested in desperate calls to help lines and desks of peripheral manufacturers and computer retailers where new and upgraded device drivers are distributed.

In addition to the installation of new peripheral devices, vintage peripheral devices of anywhere from one month to several years of age are often transferred from one computer to another. The same problems of obtaining proper device drivers to allow a host computer to communicate with the peripheral device are manifested again, but in this case to a greater extent because of the potential that the device is no longer supported. Even if the appropriate device driver is available, the task of tracking that driver down may exceed the value of the peripheral.

Furthermore, there are costs associated with the development of device drivers and assuring that the device drivers are included in software packages developed and offered for sale in the retail marketplace. As with the development of any software package, the development of a device driver requires hiring of engineers with appropriate experience. Once developed, drivers must undergo rigorous testing. If a released device driver does not properly operate a peripheral device, the peripheral device can effectively be rendered inoperative, thereby resulting in cost far beyond those associated with development of the device driver itself.

Regarding the assurance that device drivers are included in software packages on the retail market, developers of software packages typically rely on a toolkit developer to maintain a library of drivers for multiple peripheral devices. The software package developer purchases a toolkit which is then linked into the developed software package, thus allowing the developed software package to access any peripheral device supported in that toolkit.

Like the development of software drivers, toolkits are not free. Increased cost results from the fact that toolkit manufacturers require peripheral developers to pay a fee in order to have their peripheral device driver included in the next toolkit release. In addition, developers of software packages must also pay the toolkit developers a royalty for each model peripheral device they wish to have included in the library they purchase.

Because device drivers are utilized to format communications between a computer and a peripheral device, problems and added expense occur. The problems relate mainly to the location and installation of new and upgraded device drivers, and the added expense relates mainly to the same plus development and distribution costs of the device drivers.

The present inventor has realized that the conventional solution of providing a software driver for formatting communications between an application executing on a host computer and a peripheral device attached thereto has drawbacks which are potentially either inconvenient, an added expense, or prohibitive to potential users of that peripheral device.

SUMMARY OF THE INVENTION

Accordingly, it is an object of this invention to provide a disk drive emulator attached to a peripheral device such that the peripheral may be operated from a host computer as a disk drive without the need of a device driver.

It is another object of the invention to provide a setup program resident on a peripheral device and executable by a host computer allowing a user to enter operational parameters and commands to direct operation of the peripheral device.

These and other objects are accomplished by a disk drive emulator attached to or included in a peripheral device. Because the peripheral device has an attached disk drive emulator, the host computer interacts with the peripheral device as if it is a disk drive. Because a disk drive is a standard device, all operating systems are able to perform basic disk drive functions such as opening and saving a file. The disk drive emulator translates Open File and Save File commands received from the host computer and interprets those commands as functions to be performed by the peripheral device.

The disk drive emulator maintains a setup program which constitutes an Application Program Interface (API) enabling communications between a user and the peripheral device. The setup program is accessible by the host computer, and upon execution, a menu is provided in which the user may select various operational parameters and commands to direct operations of the peripheral device. The setup program then saves these operational parameters and commands to the disk drive emulator using a Save File command. When the appropriate command is received via the disk drive emulator, the peripheral device is operated in accordance with that command and the parameters saved by the setup program. In one embodiment, the interface between the host computer and disk drive emulator is a SCSI interface, and the peripheral device is an optical scanner.

The operational parameters and commands entered at the menu of the setup program and saved to the disk drive emulator are stored in a memory and are visible as a file to the operating system of the host computer. When an application running on the host computer performs a File open command on a file corresponding to saved operational parameters, the disk drive emulator directs operation of the optical scanner based upon the stored operational parameters and transfers data resulting from operation of the scanner to the application as if a file is being opened.

Alternatively, when the operational parameters and commands are saved via a File Save command to the disk drive emulator, the optical scanner is operated in accordance thereof and data resulting from operation of the scanner is transferred to a file.

The operational parameters and commands entered or selectable by the user include Pixel Depth, Resolution, Brightness, Contrast, Gamma, Filter, Page Size, File Name, File Type, Feeder, and Flatbed parameters, and Scan, Open File, Save File, and Cancel commands.

An application program having an Aquire command for retrieving image data from a scanner is provided with a DLL link to the setup program. The DLL link operates such that when the Aquire command is invoked the application calls the setup program. When the user completes entering operational parameters and commands, they are written to the disk driver emulator utilizing a File Save command. The disk drive emulator then operates the optical scanner in accordance with the operational parameters and commands, and image data resulting from that operation is transferred from the scanner to a current window of the application program.

To accommodate multiple computer platforms, multiple setup programs are provided, each setup program corresponding to a specific computer platform. An external switch is provided having multiple positions, each position identifying a type of computer platform and corresponding to one of the multiple setup programs. The disk drive emulator only allows a setup program corresponding to a computer platform identified by the external switch to be visible to the host computer.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
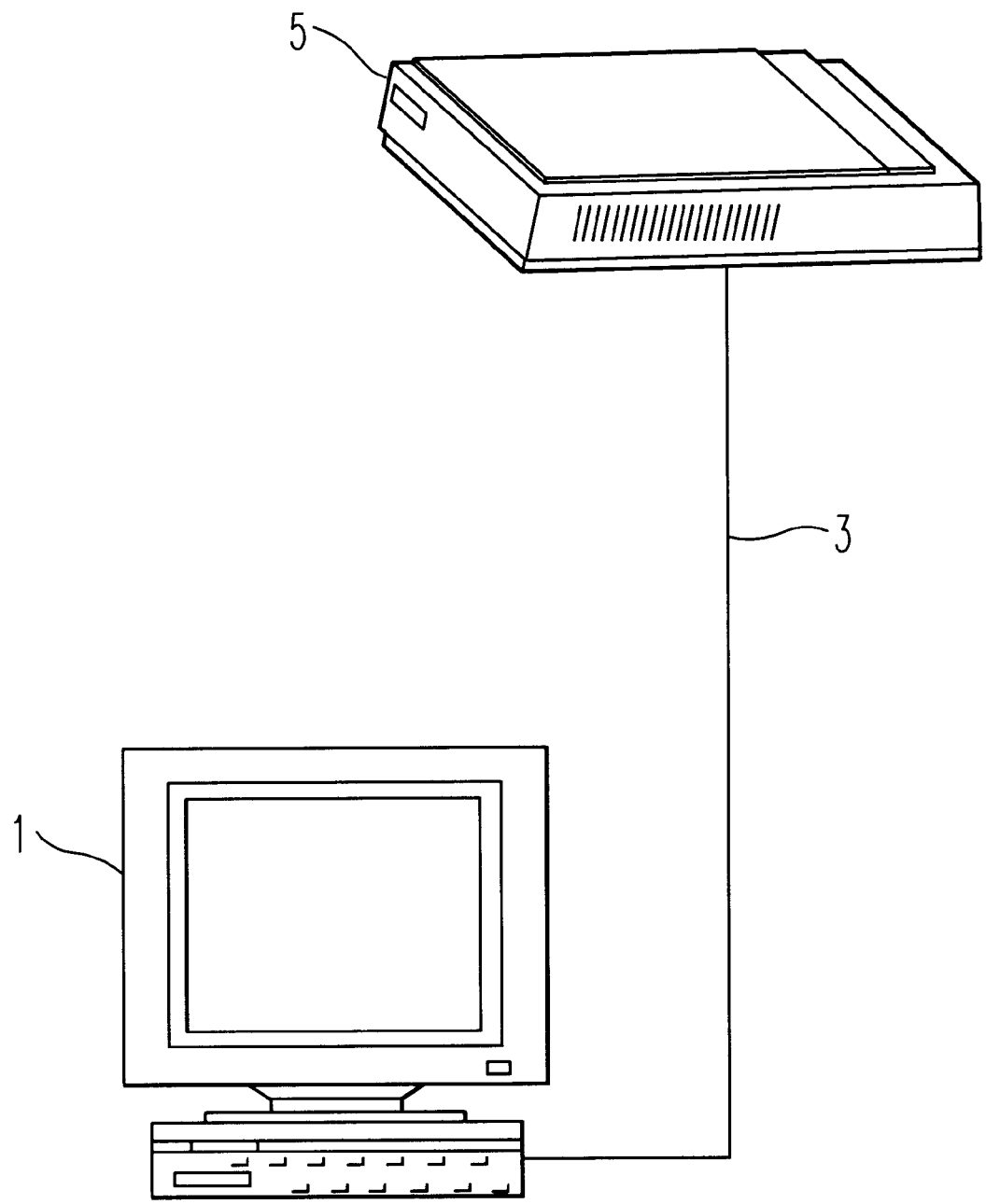
FIG. 1 illustrates a conventional computer workstation connected to an image scanner.
Figure 2:
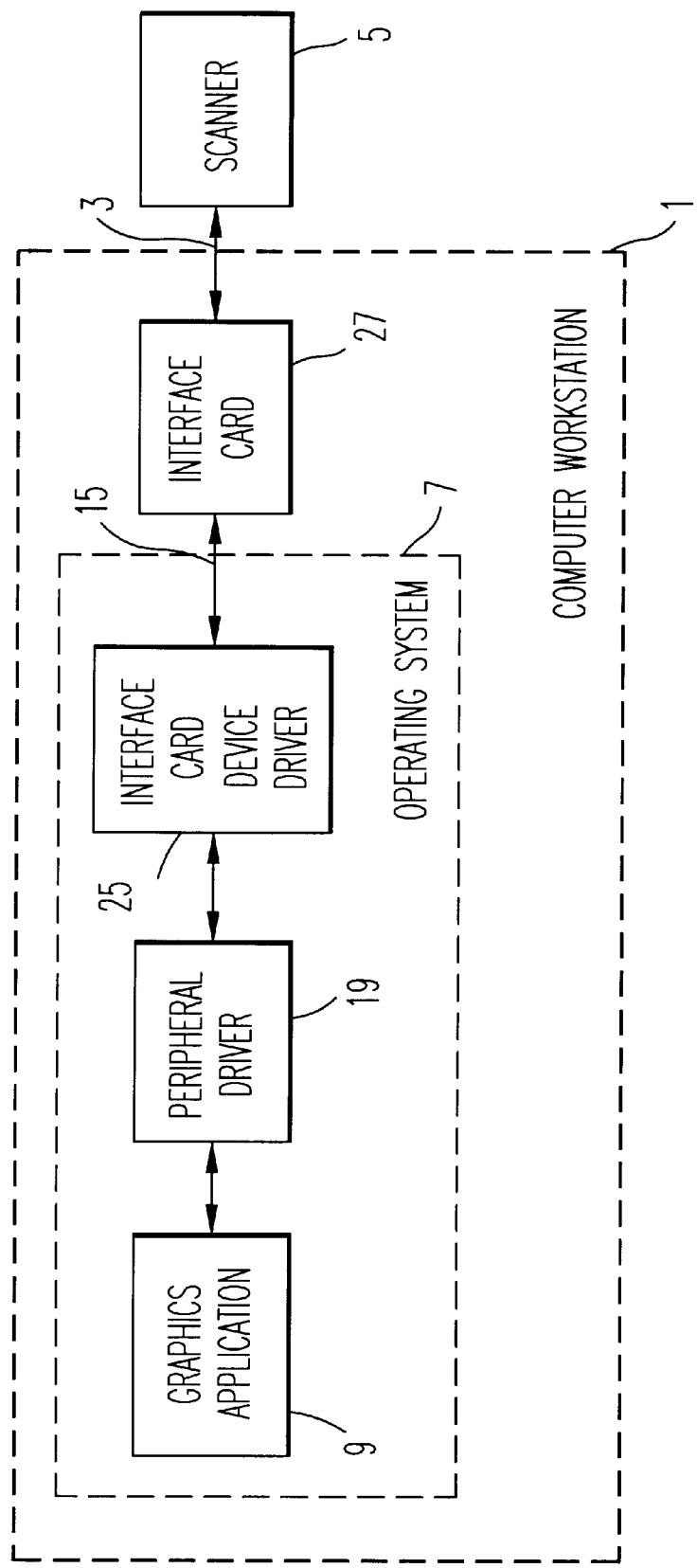
FIG. 2 illustrates communications between an application executing on a computer workstation and a scanner.

Referring now to the drawings, wherein like reference numerals designate identical or corresponding parts throughout the several views, and more particularly to FIG. 1 thereof, there is illustrated a conventional computer workstation 1 connected to a scanner 5 using a connecting cable 3. As a peripheral device, the scanner 5 would likely be set up as shown in FIG. 2 with a graphics application 9, a peripheral driver 19, an interface card device driver 25, and an operating system 7, all hosted on computer workstation 1.

Graphics application 9 is any software application that would access scanner 5 to retrieve data or is capable of manipulating graphics data, such as Adobe Photoshop or Corel Draw, for example. Peripheral driver 19 is a software application that formats communications between the graphics application 9 and scanner 5. The interface card device driver 25 is a software application that formats communications as required for transfer across the connecting cable 3 to the scanner 5, similar to the operation of a SCSI driver in relation to a SCSI card. Operating system 7 is a software application that provides a user interface for invocation and a platform for operation of other software applications.

The computer workstation 1 is also shown having an interface card 27 which receives communications from computer workstation 1, placing the communications on the connecting cable 3 as required for delivery to the scanner 5. The interface card 27 is attached to a computer bus 15 thereby resulting in the connection of the computer workstation 1 to the scanner 5. The configuration of FIG. 2 allows the graphics application 9 to control the scanner 5 by communicating with the peripheral driver 19 which properly formats the scanner commands from the graphics application 9 and provides the properly formatted commands to the interface card device driver 25 which then packages those commands in a format for transportation to the interface card 27 and across the connecting cable 3 to the scanner 5.

A problem that exists in the prior art thus described is embodied in the peripheral driver 19 which must provide commands in proper format for the scanner 5 and is therefore a specifically developed software application commonly referred to as a device driver. The peripheral driver 19 will almost assuredly need to be changed with any changes or upgrades to the scanner, computer, or operating system. For instance, peripheral driver 19 will need to be changed any time the scanner 5 is replaced with a different or newer version scanner (not shown), such as a new model or a model from a different manufacturer, or if the operating system 7 is upgraded, such as from DOS to Windows or Windows 3.1 to Windows 95, or if the computer workstation 1 is changed, such as from an Intel based X86 processor to a Macintosh. Also, movement of the scanner 5 to another computer workstation (not shown), even though perhaps similar to the computer workstation 1, may require finding a peripheral driver matching the platform and operating system in accordance with that similar computer workstation.

Figure 3:
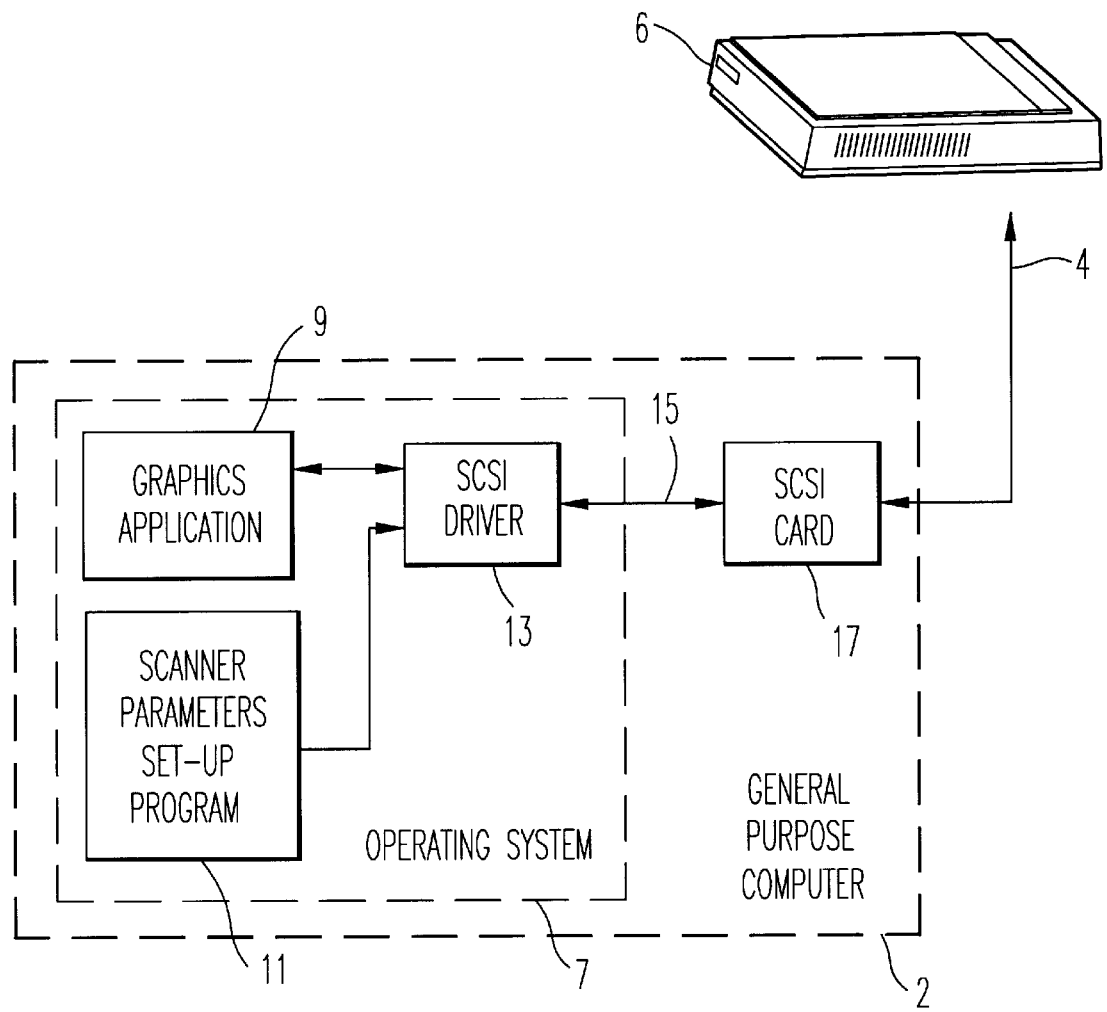
FIG. 3 illustrates a scanner connected to a SCSI bus of a general purpose computer and the software components of the general purpose computer used to operate the attached scanner constructed in accordance with the present invention.

In order to solve the problem in the prior art relating to locating and installing an appropriate driver for a peripheral device, such as a scanner, FIG. 3 illustrates a disk drive emulating scanner 6 attached to a general purpose computer 2 wherein the operating system 7 is hosted and the graphics application 9 and a scanner parameters setup program 11 are executed. Both the scanner parameters setup program 11 and the graphics application 9 communicate with the disk drive emulating scanner 6 via the SCSI driver 13, the operating system 7, a computer system bus 15, a SCSI card 17 and a SCSI bus 4 using standard disk drive commands Open File and Save File.

Both Open File and Save File commands are standardized commands that can be invoked by software applications executing in a computer environment based on any standardized operating system. The Open File command directs the operating system to read a file stored on a storage device and provide the data contained therein to the software application invoking the command. The Save File command directs the operating system to store data from the software application invoking the Save File command to a file on a storage device.

Figure 4:
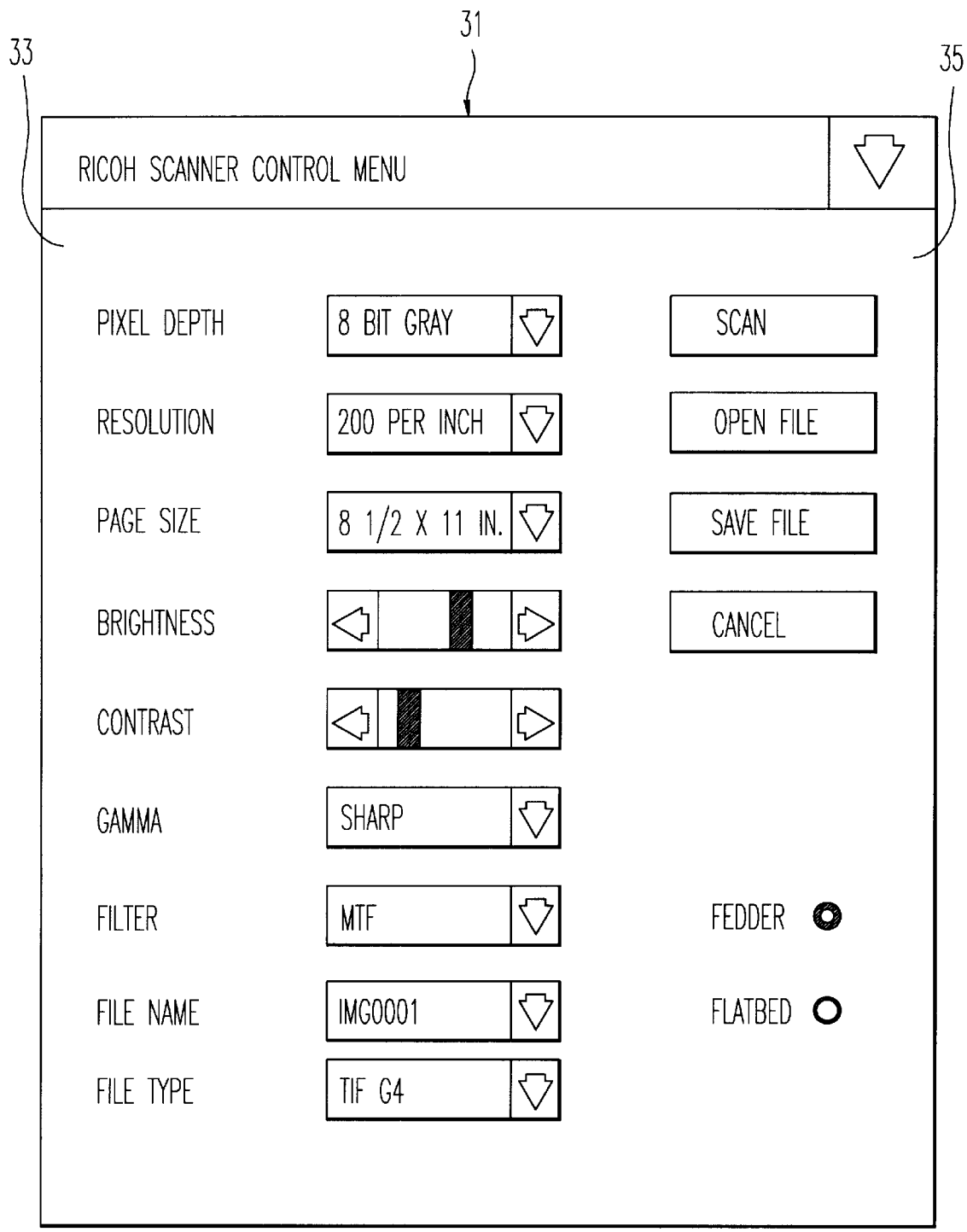
FIG. 4 illustrates a graphical scanner control menu in accordance with the present invention.

The scanner parameters setup program 11 is a software application that provides a scanner control menu 31 as shown in FIG. 4 on which a computer user may enter scanner parameters 33 and scanner commands 35 which will then be used in operation of the disk drive emulating scanner 6. The scanner control menu 31 utilizes standard graphical pulldown menus, text boxes, slide bars, and buttons for input of the scanner parameters 33 and the scanner commands 35. The scanner parameters setup program 11 is originally resident within the disk drive emulating scanner 6 and is accessible by and executed on the general purpose computer 2.

Figure 5:
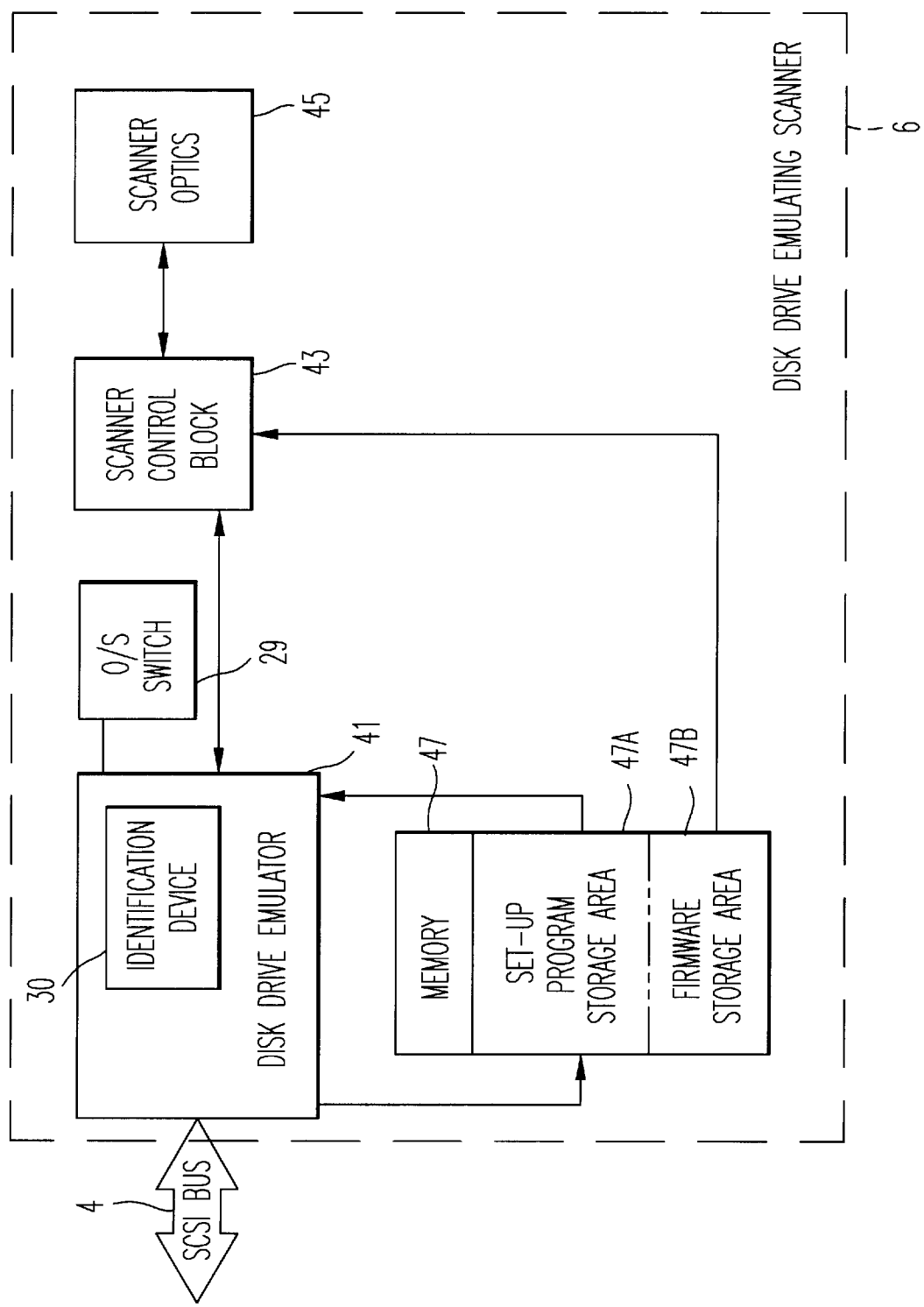
FIG. 5 illustrates a scanner peripheral device according to the present invention.

FIG. 5 illustrates the major control and communication paths within the disk drive emulating scanner 6. A disk drive emulator 41 receives Open File or Save File commands sent from the general purpose computer 2 over the SCSI bus 4.

Prior to execution, the scanner parameters setup program 11 is stored in a setup program storage area 47A of a memory 47 on the disk drive emulating scanner 6. When receiving an Open File command for the scanner parameters setup program 11, the disk drive emulator 41 retrieves the scanner parameters setup program 11 from setup program storage area 47A and transfers the scanner parameters setup program 11 via the SCSI bus 4 to the general purpose computer 2 for execution. When receiving a Save File command for a file with the scanner parameters 33 and the scanner commands 35 entered by the user, the disk drive emulator 41 retrieves the scanner parameters 33 and the scanner commands 35 contained therein. Thus, the scanner parameters setup program 11 constitutes an Application Program Interface (API) that enables communications between the user and the disk drive emulating scanner 6.

Operation of the scanner optics 45, which includes, for example, a Charge Coupled Device (CCD), illuminating lamp, mirrors, a motor to move appropriate parts, etc., is commanded by the scanner control block 43. The scanner control block 43 is implemented as a programmable device operating based on a set of firmware instructions (not shown) stored in a firmware storage area 47B in the memory 47. The firmware instructions stored in firmware storage area 47B are loaded into the scanner control block 43 upon power-up of the disk drive emulating scanner 6. The scanner optics 45 are operated in accordance with the firmware instructions and scanner parameters 33 upon transfer of those parameters to the scanner control block 43.

Alternatively, the setup program storage area 47A is constructed from flash memory. Flash memory is a non-volatile memory that can be written to via software instructions, and therefore the contents of the memory (i.e., the scanner parameters setup program 11, or applicable API) can then be upgraded via the general purpose computer 2. Similarly, the entire memory 47 including the setup program storage area 47A and the firmware storage area 47B are constructed from flash memory and upgradable via the general purpose computer 2.

When utilizing flash memory, the disk drive emulator 41 identifies if a file identified in a Save File command contains data or a program corresponding to a specific area of the memory 47. Identification is based upon a file name, or identifying specific file contents, for example, and is performed by identification device 30. Upon identification, the disk drive emulator 41 writes the contents of the file to the corresponding area of memory 47. For example, a file containing an upgraded version of the scanner parameters setup program 11 would be identified and stored in the setup program storage area 47A.

In one embodiment, the disk drive emulator 41 saves the scanner parameters 33 to a file in the memory 47. Then, upon receiving a File Open command directed toward the opening of a file thus saved, the disk drive emulating scanner performs a scan in accordance with the saved parameters and transfers image data resulting therefrom to the general purpose computer as if the file were being opened.

In more detail, the disk drive emulator 41 receives a File Open command from the SCSI bus 4 directed toward opening a file stored in the memory 47 containing the scanner parameters 33. The disk drive emulator 41 then retrieves the file, and transfers the scanner parameters 33 contained therein to the scanner control block 43. The scanner control block 43 then commands operation of scanner optics 45 in accordance with the transferred parameters. The disk drive emulator 41 then returns image data resulting from the scan to the SCSI bus 4 for transfer to the general purpose computer 2.

Figure 6:
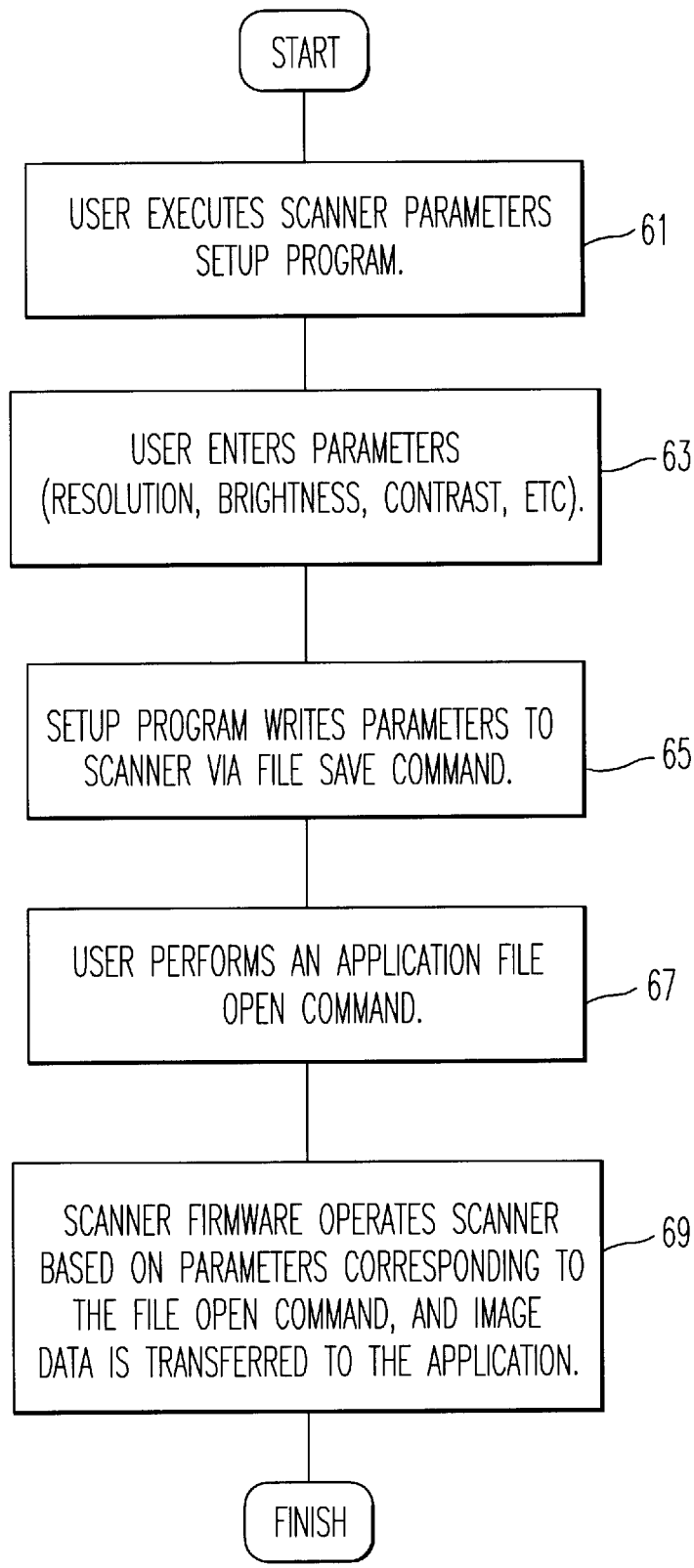
FIG. 6 is a flowchart of the operation of an embodiment of the present invention.

From a user standpoint, the present invention is easily operated. As shown in FIG. 6, operation of the present invention begins with step 61 wherein the user executes the scanner parameters setup program 11. The scanner parameters setup program 11 is resident in the memory 47 in the setup program storage area 47A and is executed by any standard invocation such as a command issued at a command prompt, via a File Manager (not shown), or via a link to an icon displayed on a Program Manager (not shown). In the case of command prompt invocation under the Disk Operating System (DOS), the invocation would appear as:

C>d:\setup.exe, where C> corresponds to the command prompt, d:\corresponds to the disk drive emulating scanner 6 emulating logical drive d, and setup.exe corresponds to the scanner parameters setup program 11. When executed, the scanner parameters setup program 11 displays the scanner control menu 31.

At step 63, the user enters parameters on the scanner control menu 31 including resolution, brightness, contrast, etc, as desired. At step 65, the scanner parameters setup program 11 writes the parameters thus entered to the disk drive emulating scanner 6 via a File Save command. At step 67, the user performs a File Open command from an active software application to read a file corresponding to the scanner parameters 33 and stored on the disk drive emulating scanner 6. At step 69, the disk drive emulator 41 operates the disk drive emulating scanner 6 based on the parameters written to disk drive emulator 41 and corresponding to the File Open command in step 67. Image data resulting from the scanning operation is transferred to the application.

Figure 7:
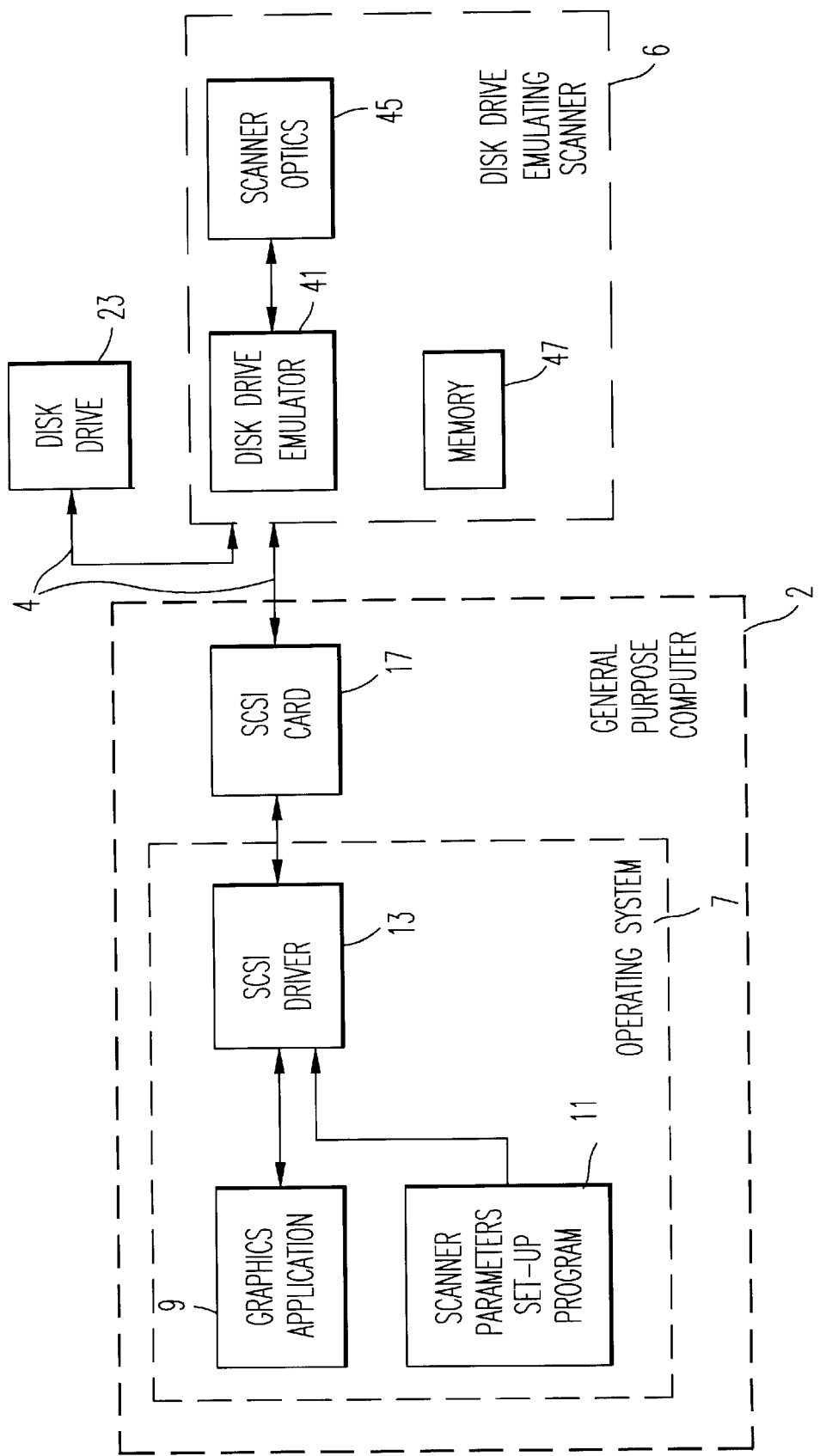
FIG. 7 illustrates a scanner peripheral device according to the present invention including a disk drive attached to a SCSI bus.

FIG. 7 illustrates another embodiment of the present invention including a disk drive 23 attached to the SCSI bus 4. In this embodiment, the disk drive 23 is utilized to store image data generated from scan operations of the disk drive emulating scanner 6. When the scanner optics 45 are operated in accordance with the scanner parameters 33, image data resulting from that operation is directed by the disk drive emulator 41 to the disk drive 23 for storage in a file. Once stored, the image data can be read from the disk drive 23 like any other file stored on a disk drive. If desired, the disk drive 23 is housed within the disk drive emulating scanner 6.

The embodiment including disk drive 23 could alternatively be implemented without disk drive 23 by providing enough storage in the memory 47 (which may be implemented using any desired semiconductor memory and/or as a disk drive) for saving image files. In this alternative embodiment, image data resulting from operation of the scanner optics 45 is directed by disk drive emulator 41 to the memory 47 where the image data is stored as a file accessible to the general purpose computer 2.

Figure 8:
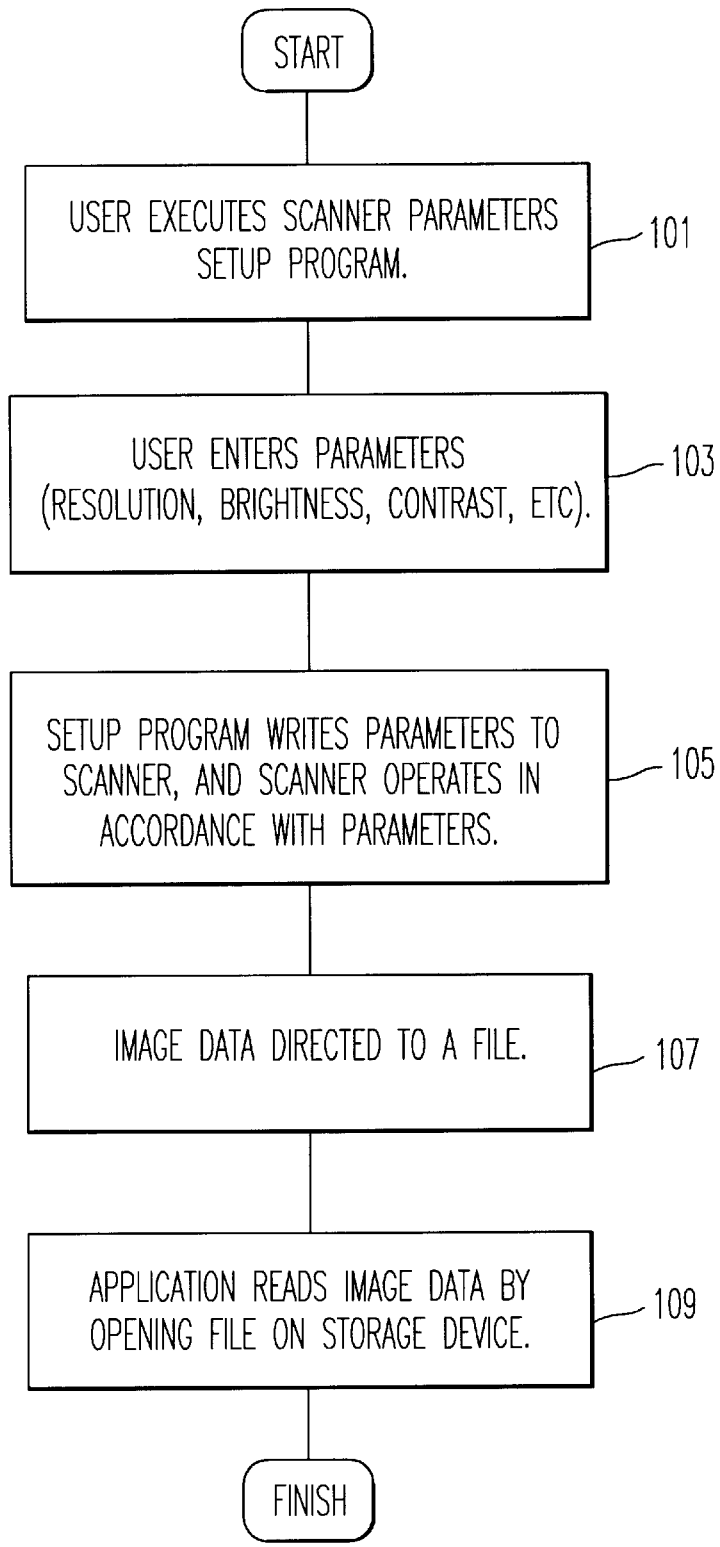
FIG. 8 is a flowchart of the process of operating a scanner peripheral device and saving image data to a file in accordance with the present invention.

The operation, from a user standpoint, of the embodiment including disk drive 23 or alternatively utilizing the memory 47 for storage of image data, is illustrated in FIG. 8. In FIG. 8, at step 101, a user executes the scanner parameters setup program 11, which brings up the scanner control menu 31. At step 103, the user enters the scanner parameters 33 as desired, and at step 105, the scanner parameters setup program 11 writes the scanner parameters 33 to the disk drive emulating scanner 6 which is operated in accordance with the written parameters.

At step 107, image data resulting from operation of the disk drive emulating scanner 6 is directed to and saved as a file. Once saved as a file, the image data is accessible to any application capable of reading image data. At step 109, an application reads the stored image data.

In the above steps, illustrated in FIG. 8, the image data directed to a file is in one embodiment directed to a file on the disk drive 23. In an alternative embodiment, the image data is directed to a file in the memory 47, as described above.

In yet another embodiment, an Aquire command (not shown) of the graphics application 9 is provided with a DLL link (not shown). A DLL link is an entry in an application program's Dynamic Link Library (DLL). A DLL link links the occurrence of external events (such as invocation of an Aquire command) to the execution of external programs (such as the scanner parameters setup program 11) to perform some function. The DLL link is setup to execute the scanner parameters setup program 11 upon invocation of the Aquire command. After the user enters the scanner parameters 33, the disk drive emulating scanner is operated. Image data resulting from operation of the disk drive emulating scanner 6 in accordance with the scanner parameters 33 is transferred to a current window (not shown) in the graphics application 9.

Figure 9:
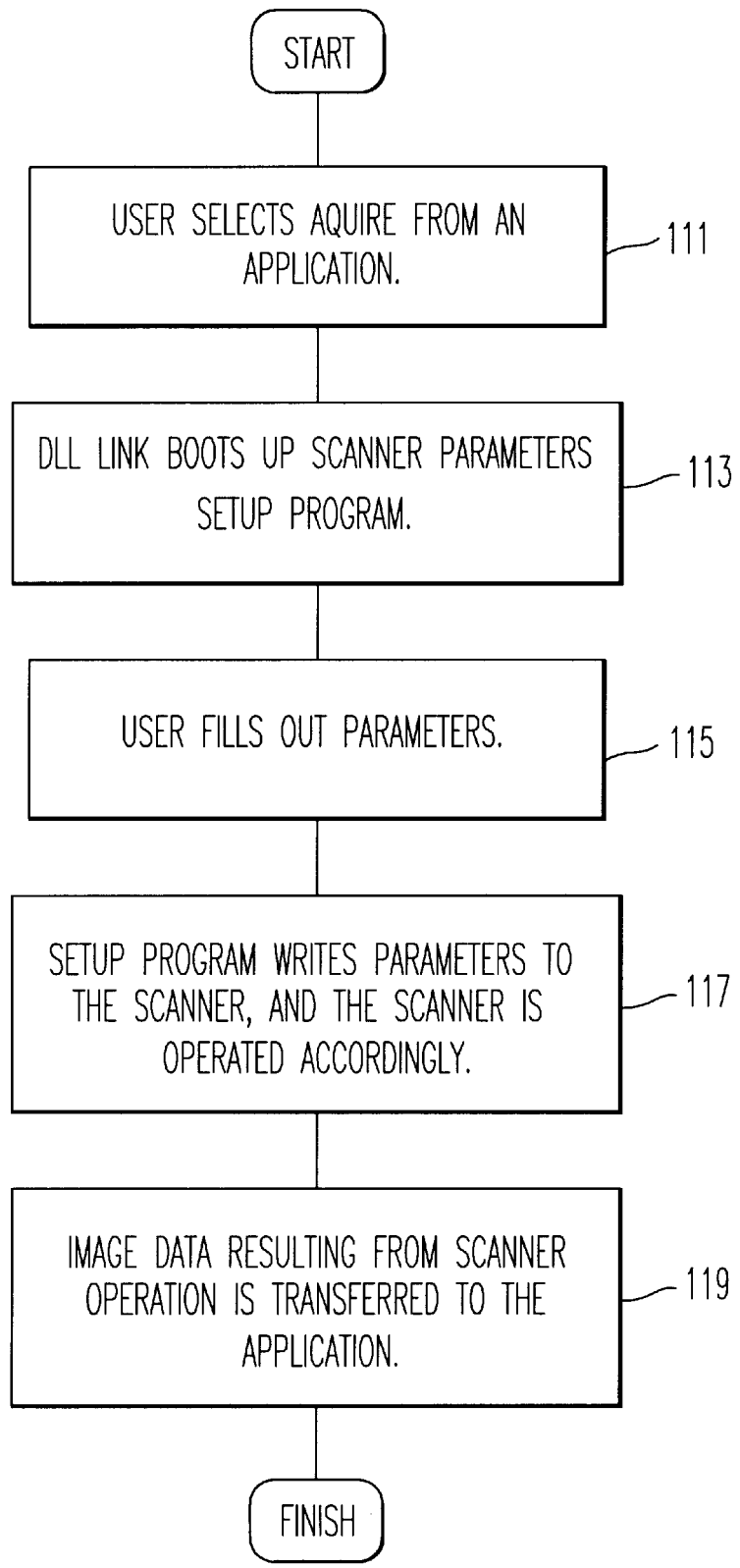
FIG. 9 is a flowchart of the process of operating an attached peripheral scanner in accordance with an alternative embodiment of the present invention including a DLL link within a software application.

The operation of the DLL link embodiment is illustrated in FIG. 9. FIG. 9 begins at step 111 wherein the user invokes an Aquire command from the graphics application 9. The Aquire command initiates the startup of the scanner parameters setup program 11 via the DLL link at step 113. As in the embodiments described above, a user fills out the scanner parameters 33, as desired, at step 115. At step 117, the scanner parameters 33 are written to disk drive emulating scanner 6 which is operated in accordance with the scanner parameters 33. And finally, at step 119, image data resulting from the above scan is transferred to the graphics application 9.

In another embodiment, the disk drive emulating scanner 6 supports multiple operating systems and is provided with an O/S switch 29 to indicate the operating system 7 hosted on the general purpose computer 2 (See FIG. 5). The O/S switch 29 is constructed to have multiple positions, one position for each operating system supported. As one example, a four position switch is provided, one position for each of Operating System 2 (OS/2), Disk Operating System (DOS), Windows 3.1, and Windows 95 operating systems.

The disk drive emulating scanner 6 further provides storage in the memory 47 in the setup program storage area 47A for multiple versions of the scanner parameters setup program 11, one version corresponding to each operating system supported.

The O/S switch 29 is connected to and provides an input to the disk drive emulator 41. In this embodiment, the disk drive emulator 41 allows only one of the multiple versions of the scanner parameters setup program 11 to be accessible to the operating system 7 and the general purpose computer 2. The version of the scanner parameters setup program 11 thus accessible is the version corresponding to the position of the O/S switch 29. Thus, a user utilizes O/S switch 29 to identify the operating system hosted on the general purpose computer 2, and the disk drive emulating scanner 6 is operable without further modification on any number of computer platforms and varying operating systems.

Figure 10:
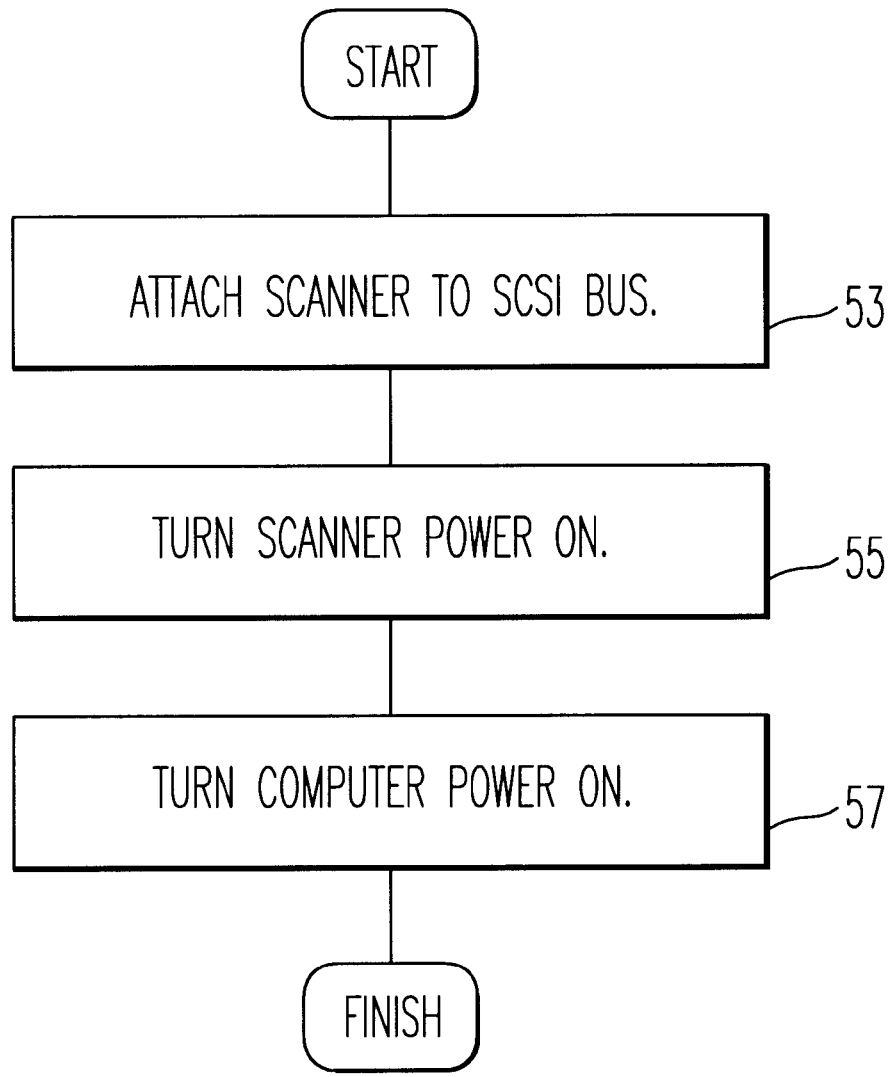
FIG. 10 is a flowchart of the process of connecting a scanner peripheral device to a host computer in accordance with the present invention.

The present invention is easily installed on a computer workstation. The flow diagram of FIG. 10 illustrates the installation process including the steps of attaching a disk drive emulating scanner to a SCSI bus, 53, turning scanner power on, 55, and turning the computer on, 57. When attached to a SCSI bus, as in step 53, the disk drive emulating scanner will be identified by a host computer as a disk drive, because the disk drive emulator 41 provides electronic signals identical to those of a standard disk drive. This results in a single step for installation of the disk drive emulating scanner 6. Of course, for operations, scanner and computer power must be applied as shown in steps 55 and 57.

Installation of the present invention is far simpler than installation of a current industry standard peripheral such as scanner 5 because additional steps are required for the current industry standard including the location and installation of an appropriate device driver.

A disk drive emulator is a device that has primary functions other than storing data, but would be identified by an attached computer as a conventional disk drive. In this invention, the disk drive emulating scanner 6 includes a disk drive emulator 41 which is identified by general purpose computer 2 as a disk drive but has primary functions other than storing data including scanning an image, identifying File Open and File Save commands issued in relation to operation of the disk drive emulating scanner 6, performing updates of programs stored on the disk drive emulating scanner 6, and commanding operation of the disk drive emulating scanner 6.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A method of operating an optical scanner having a disk drive emulator, comprising the steps of:

connecting said optical scanner having said disk drive emulator to a host computer via a computer interface;

executing an application program interface (API) program resident in a memory;

reading operational parameters of said optical scanner from said disk drive emulator in response to execution of said API program;

displaying a user interface of said API program including said operational parameters which have been read that allows a user to modify said operational parameters at said host computer;

saving said operational parameters modified by said user via a Save File command from said API program to said disk drive emulator; and operating said optical scanner and performing a scanning operation in accordance with the stored operational parameters in response to a File Open command being received by said disk drive emulator.

2. The method according to claim 1, wherein said saving step comprises:

saving said operational parameters and commands which include Pixel, Resolution, Brightness, Contrast, Gamma, Filter, Page Size, File Name, File Type, Feeder, and Flatbed parameters, and Scan, Open File, Save File, and Cancel Commands by said API program to said disk drive emulator by said API program via said Save File command.

3. The method according to claim 1, further comprising the steps of:

providing a DLL link to an application program having an Aquire command for retrieving image data from the scanner such that when said Aquire command is invoked, said application program calls said API program;

entering said operation parameters by said user via said user interface;

saving said operational parameters to said disk drive emulator via a File Save command;

operating said optical scanner in accordance with said operational parameters saved to said disk drive emulator; and transferring image data resulting from operation of said optical scanner in accordance with said operational parameters via said disk drive emulator to a currently active window of said application program.

4. The method according to claim 3 further comprising the steps of:

upgrading said API program by saving a file containing an upgraded API program to said disk drive emulator;

identifying said upgraded API program; and writing said upgraded API program to a corresponding location in said memory.

5. The method according to claim 4, further comprising the steps of:

identifying an operating system on said host computer via a user selectable switch connected to said disk drive emulator and having multiple positions, one position for each operating system supported by said disk drive emulator; and allowing only one of multiple API programs resident in said memory of said disk drive emulator to be accessible to said host computer, each of said multiple API programs corresponding to a specific operating system, and the API program accessible to said host computer corresponds to said operating system identified by said switch.

6. The method according to claim 3, further comprising the steps of:

identifying an operating system on said host computer via a user selectable switch connected to said disk drive emulator and having multiple positions, one position for each operating system supported by said disk drive emulator; and allowing only one of multiple API programs resident in said memory of said disk drive emulator to be accessible to said host computer, each of said multiple API programs corresponding to a specific operating system, and the API program accessible to said host computer corresponds to said operating system identified by said switch.

7. The method according to claim 1 further comprising the steps of:

upgrading said API program by saving a file containing an upgraded API program to said disk drive emulator;

identifying said upgraded API program; and writing said upgraded API program to a corresponding location in said memory.

8. The method according to claim 1, further comprising the steps of:

identifying an operating system on said host computer via a user selectable switch connected to said disk drive emulator and having multiple positions, one position for each operating system supported by said disk drive emulator; and allowing only one of multiple API programs resident in said memory of said disk drive emulator to be accessible to said host computer, each of said multiple API programs corresponding to a specific operating system, and the API program accessible to said host computer corresponds to said operating system identified by said switch.

9. A method according to claim 1, further comprising the step of:

reading said application program from said memory which is located in said disk drive emulator, before the step of executing the API program.

10. A disk drive emulator for use with a peripheral device, comprising:

a computer interface for connecting said disk drive emulator to a host computer;

a means for emulating a disk drive connected to said computer interface;

a memory for storing operational parameters for operation of said peripheral device of said disk drive emulator;

a command identification device for identifying File Open and File Save commands issued from said host computer to said disk drive emulator;

means for storing said operational parameters transmitted from the host computer in response to a File Save command;

means for operating said peripheral device to perform a scanning operation in accordance with the stored operational parameters upon receipt of a File Open command.

11. The disk drive emulator according to claim 10, wherein said computer interface is a Small Computer System Interface (SCSI).

12. The disk drive emulator according to claim 11 wherein said disk drive emulator further comprises:

a first and second API program, each of said API programs corresponding to a specific operating system, for execution by the host computer, and for operation of said peripheral device; and an external switch for identifying a computer operating system and having positions, one position each corresponding to one of said multiple API programs;

wherein said disk drive emulator only allows an API program which corresponds to a operating system identified by said external switch to be visible to said host computer.

13. The disk drive emulator according to claim 12, further comprising:

a program identification device for identifying files saved to said disk drive emulator containing programs and data corresponding to specific areas of said memory;

wherein:

said memory is a flash memory; and said memory is written to by said disk drive emulator with files containing programs and data corresponding to specific areas of said memory, thereby upgrading programs and data stored in said memory.

14. The disk drive emulator according to claim 10 wherein said disk drive emulator further comprises:

a first and second API program, each of said API programs corresponding to a specific operating system, for execution by the host computer, and for operation of said peripheral device; and an external switch for identifying a computer operating system and having positions, one position each corresponding to one of said multiple API programs;

wherein said disk drive emulator only allows an API program which corresponds to a operating system identified by said external switch to be visible to said host computer.

15. The disk drive emulator according to claim 14, wherein:

said memory is a flash memory; and said first API program resident in said memory is upgradable by writing an upgraded API program to said disk drive emulator.

16. The disk drive emulator according to claim 10, further comprising:

a program identification device for identifying files saved to said disk drive emulator containing programs and data corresponding to specific areas of said memory;

wherein:

said memory is a flash memory; and said memory is written to by said disk drive emulator with files containing programs and data corresponding to specific areas of said memory, thereby upgrading programs and data stored in said memory.

17. A disk drive emulator according to claim 10, further comprising:

means for reading said operational parameters from said memory and displaying on a user interface said operational parameters which have been read.

18. A disk drive emulator according to claim 10, wherein said memory further stores an executable file for execution by the host computer which allows the host computer to read and write said operational parameters from and to the memory of said disk drive emulator.

19. The disk drive emulator according to claim 10, wherein:

said memory for storing operational parameters stores values representing Pixel, Resolution, Brightness, Contrast, Gamma. Filter, Page Size, File Name, File Type, Feeder, and Flatbed parameters, and Scan, Open File, Save File, and Cancel Commands.

20. The disk drive emulator according to claim 19 wherein said disk drive emulator further comprises:

a first and second API program, each of said API programs corresponding to a specific operating system, for execution by the host computer, and for operation of said peripheral device; and an external switch for identifying a computer operating system and having positions, one position each corresponding to one of said multiple API programs;

wherein said disk drive emulator only allows an API program which corresponds to a operating system identified by said external switch to be visible to said host computer.

21. The disk drive emulator according to claim 20, further comprising:

a program identification device for identifying files saved to said disk drive emulator containing programs and data corresponding to specific areas of said memory;

wherein:

said memory is a flash memory; and said memory is written to by said disk drive emulator with files containing programs and data corresponding to specific areas of said memory, thereby upgrading programs and data stored in said memory.

22. A method of operating an optical scanner having a disk drive emulator, comprising the steps of:

connecting said optical scanner having said disk drive emulator to a host computer via a computer interface;

reading, by said host computer, of operational parameters of said optical scanner from said disk drive emulator;

displaying a user interface including said operational parameters which have been read that allows a user to modify said operational parameters at said host computer;

saving said operational parameters modified by said user via a save file command; and operating said optical scanner and performing a scanning operation in accordance with the stored operational parameters in response to a file open command.

* * * * *